US006470576B2

(12) United States Patent
Watson

(10) Patent No.: US 6,470,576 B2
(45) Date of Patent: *Oct. 29, 2002

(54) BATTERY POWERED CIRCULAR SAW

(75) Inventor: James B. Watson, Convers, GA (US)

(73) Assignee: One World Technologies, Inc., Anderson, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/740,133

(22) Filed: Dec. 18, 2000

(65) Prior Publication Data

US 2001/0000552 A1 May 3, 2001

Related U.S. Application Data

(63) Continuation of application No. 09/134,016, filed on Aug. 14, 1998, now Pat. No. 6,161,293.

(51) Int. Cl.[7] .............................................. B23D 47/02
(52) U.S. Cl. ..................... 30/377; 30/388; 30/DIG. 1
(58) Field of Search ................... 30/377, 388, DIG. 1; 310/47, 50; D8/66

(56) References Cited

U.S. PATENT DOCUMENTS

| D262,772 S | 1/1982 | Glass et al. |
|---|---|---|
| 4,555,849 A | 12/1985 | Ando et al. |
| D329,363 S | 9/1992 | Sasaki et al. |
| D335,433 S | 5/1993 | Schultz et al. |
| D363,656 S | 10/1995 | Gierke |
| D375,439 S | 11/1996 | Niwa et al. |

*Primary Examiner*—M. Rachuba
*Assistant Examiner*—Omar Flores-Sánkez
(74) *Attorney, Agent, or Firm*—Brooks & Kushman P.C.

(57) ABSTRACT

A battery powered circular saw is provided with a novel motor housing and handle assembly having a rearwardly extending primary handle inclined 15° to 40° relative to a rearwardly longitudinally extending tubular housing member. A battery pack is attached to the rear end of the primary handle and is provided with an elongated projection which extends into the elongate tubular housing.

15 Claims, 1 Drawing Sheet

BATTERY POWERED CIRCULAR SAW

This application is a continuation of U.S. application Ser. No. 09/134,016, filed Aug. 14, 1998, which issued on Dec. 19, 2000, as U.S. Pat. No. 6,161,293.

TECHNICAL FIELD

This invention relates to battery powered circular saws for cutting lumber or the like.

BACKGROUND ART

While not as popular as corded AC electric motor driven saws, battery powered circular saws are gaining in popularity due to the convenience of not requiring an electric cord and their lightweight, easy to use size. Battery powered circular saws were typically made using a smaller diameter blade, typically 4" to 5½" as opposed to the traditional circular saw which uses a 7" to 8" diameter saw blade. The small diameter blade allows a thinner kerf (cut width) resulting in less energy usage and a longer battery life. A 5½" diameter circular saw can easily cut a standard 2"×4" board and if properly designed, can even cut a 2"×4" board when the blade is inclined at 45°.

Early battery powered circular saws were built much like a conventional circular saw with a battery pack merely mounted behind the electric motor. Subsequently, the industry realized that by mounting the battery rearward of the motor, with a horizontal handle extending there between, the saw's balance could be improved. Horizontal handle battery saws with the rear battery orientations, however, required in the user's wrist to be flexed at an uncomfortable angle when the saw base plate was adjusted to the minimum blade extension orientation. Additionally, prior art saws generally contain bulky handles due to the battery placement.

SUMMARY OF INVENTION

It is one of the objectives of the present invention to provide a battery powered circular saw having a handle orientation which is comfortable to the user when the base plate is mounted at the fully extended or minimum blade extended orientation. A further objective is to provide a slimmer handle for improved grip.

Accordingly, a battery powered circular saw is provided which has an electric motor rotatably driving a spindle which supports a thin circular saw blade normal to the transverse spindle axis. The motor housing and handle assembly includes a motor housing portion for supporting the electric motor, an elongate tubular portion housing extending rearwardly longitudinally from the motor housing portion generally perpendicular to the transverse axis and an elongate primary handle having a forward end attached to and spaced above the motor housing portion and a relatively lower rearward end affixed to the elongate tube or handle wherein the primary handle is inclined relative to the elongate tubular house at an angle β which is 15° to 45°. A battery pack is attached to the rearward end of the primary handle and has an elongated projection which extends into the elongate tubular housing to electrically connect the battery pack to the electric motor.

BEST MODE FOR CARRYING OUT THE INVENTION

Figures 1, 2, 3:
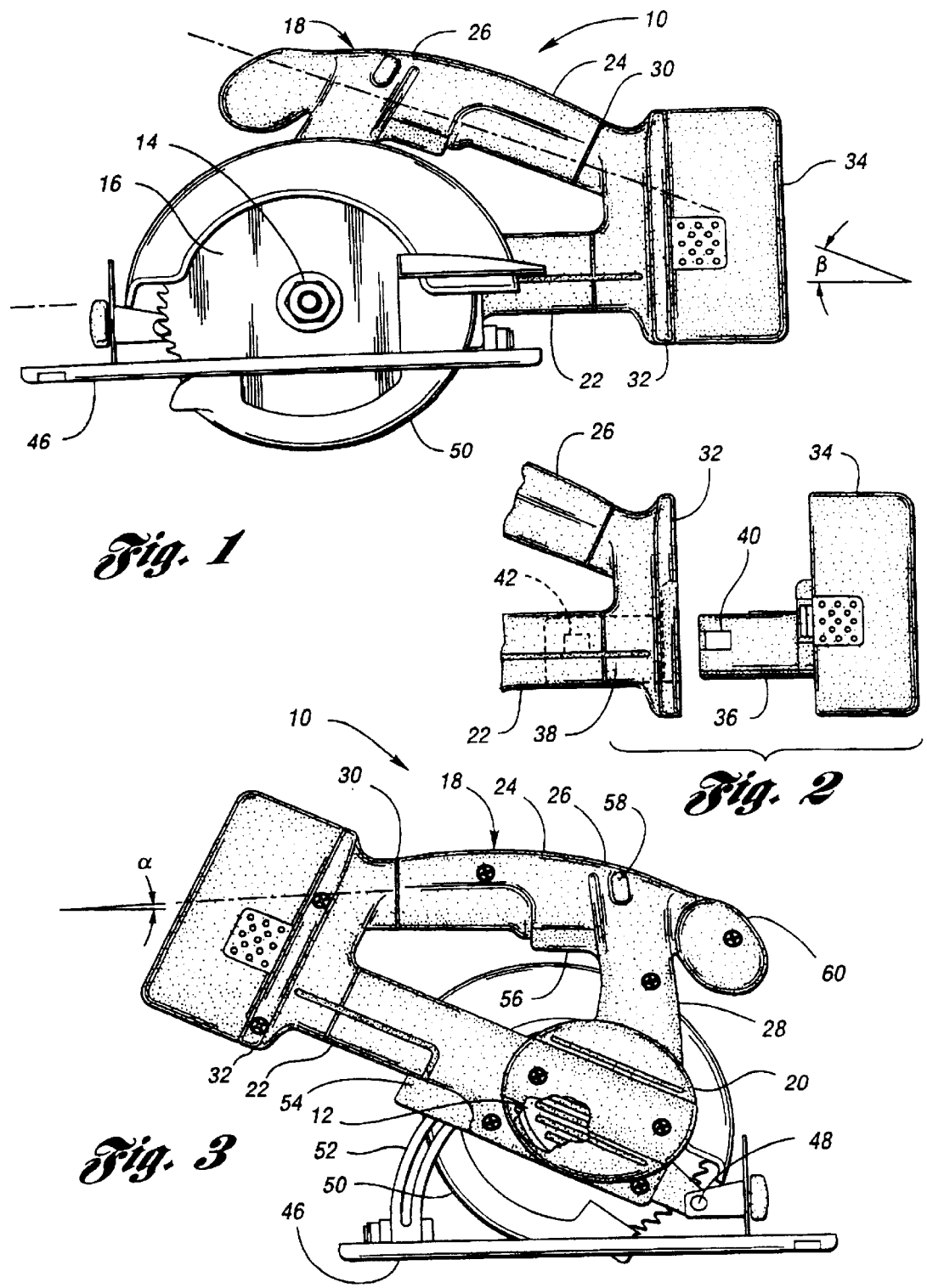
FIG. 1 is a left side elevational view of a battery powered circular saw of the present invention.
FIG. 2 is an exploded partial view of the battery powered circular saw of FIG. 1 with the battery pack removed.
FIG. 3 is a right side elevational view of the circular saw of FIG. 1 with the base plate shown in the minimum depth of cut orientation.

FIGS. 1–3 illustrate a battery powered circular saw 10 which is a preferred embodiment of the present invention. Battery powered circular saw 10 is made of a DC electric motor 12 which rotatably drives the spindle 14. Attached to spindle 14 is a thin planar circular saw blade 16 which is concentrically mounted to spindle 14 normal to the axis of the spindle rotation. Blade 16 is preferably 5½" in diameter and has a thin kerf. Blade 16 rotates about a transverse axis which extends out of the paper in FIG. 1. Spindle 14 is provided with a conventional fastener and washer for removably attaching the circular saw blade 16 with the spindle.

A motor housing and handle assembly 18 includes a motor housing portion 20 for supporting the electric motor 12 and rotatably supporting spindle 14 which is operatively driven by motor 12. Motor housing and handle assembly 18 further includes an elongated tubular housing portion 22 and an elongated primary handle 24. Elongate tubular housing 22 extends longitudinally rearward from motor housing 20 generally perpendicular to spindle 14. The primary handle 24 is provided with a forward end 26 attached to and spaced above the motor housing portion 20 by riser 28. Primary handle 24 is provided with a relatively lower rearward end 30 affixed to the elongate tubular housing 22 and forming a mounting flange 32 for supporting a battery pack 34. (High vs. Low is in reference to saw 10 as oriented in FIG. 1.)

In the preferred embodiment illustrated, battery pack 34 is removable so that it can be remotely recharged and the saw can be used with an alternative battery pack. As illustrated in FIG. 2, battery pack 34 is provided with an elongate projection 36 which is typically formed by one of the cells making up the battery pack. Elongate projection 36 is sized to be received within a corresponding tubular cavity 38 within the elongate tubular housing 22. Elongate projection 36 is provided with electrical contacts 40 for cooperating with a pair of mating electrical contacts 42 within elongate tubular housing 22. By orientating the elongate projection 36 within elongate tubular housing 22 rather than the primary handle, as is conventionally done, the shape and size of the primary handle can be optimized for gripping by a user.

Primary handle 24 is inclined at an angle β relative to elongate tubular housing 22. Preferably β falls within an angle of 15° to 40° to provide a comfortable grip for an operator when base plate 46 is oriented at the maximum depth of cut position shown in FIG. 1 and at a minimum depth of cut position shown in FIG. 3. Base plate 46 is pivotally attached at its front end to the motor housing and handle assembly 18 at pivot point 48 which is best seen in FIG. 3. Base plate 46 has a central opening (not shown) through which the saw blade 16 and a lower blade guard 50 project. A locking mechanism is provided by arcuate link 52 and locking knob and bolt 54 to lock the base plate 46 in a plurality of adjustable positions from the fully blade extended position shown in FIG. 1 to the minimum blade extension position shown in FIG. 3 and any intermediate position there between. In the preferred embodiment illustrated, the primary handle 24 is inclined slightly from the base plate when the base plate is in the minimum blade extension position by an angle α. Preferably α is within plus or minus 10° thereby minimizing the flexing of the operator's wrist when the saw is used in this orientation.

In the preferred embodiment, the motor housing handle assembly 18 is made up of a two-piece clam shell design. The upper surface of the primary handle 24 is ideally provided with an over-molded soft rubber surface for engaging the palm of the user's hand. Trigger switch 56 is conveniently located on the under side of forward end 46 of the primary handle 24. A lock-on button 58 is provided forward of the primary handle on riser 28. In the preferred embodiment illustrated, a forward handle 60 is oriented on riser 28 ahead of primary handle 24 to enable the operator to conveniently grasp the circular saw 10 with two hands.

In the preferred embodiment illustrated, battery pack 34 is removably attachable from mounting flange 32 of the motor housing handle assembly. Alternatively of course, the battery pack can be permanently affixed to the motor housing handle assembly and the battery can be recharged in place. Additionally, the configuration of the battery pack 34 with elongated projection 36 disposed within tubular housing 22 allows the girth of primary handle 24 to be independent of battery size.

It is also understood, of course, that while the form of the invention herein shown and described constitutes a preferred embodiment of the invention, it is not intended to illustrate all possible forms thereof. It should also be understood that the words used in the specification are words of description rather than limitation and various changes may be made without departing from the spirit and scope of the invention.

What is claimed is:

1. A battery powered circular saw comprising:
   a DC electric motor;
   a spindle rotatably driven by the electric motor about a transverse axis;
   a thin planar circular saw blade concentrically mounted to the spindle normal to the transverse axis;
   a motor housing and handle assembly including;
      a motor housing portion supporting the electric motor and the rotatably driven spindle;
      an elongate tubular housing portion extending longitudinally rearward from the motor housing portion generally perpendicular to the transverse axis;
      an elongate primary handle having a forward end attached to and spaced above the motor housing portion and a rearward end affixed to the elongate tubular housing portion wherein the primary handle is inclined relative to the elongate tubular housing portion at an angle β which is between 15° and 95°; and
   a battery pack removably attached to the rearward end of the primary handle and having an elongated projection extending into the elongate tubular housing portion to electrically connect the battery pack to the electric motor.

2. The battery powered circular saw of claim 1 wherein the battery pack is removably attachable to the motor housing and handle assembly.

3. The battery powered circular saw of claim 1 wherein the motor housing and handle assembly further comprises a secondary handle spaced from the primary to enable a user to securely grasp the battery powered circular saw with two hands.

4. The battery powered circular saw of claim 3 wherein the secondary handle is located forward of the elongate primary handle.

5. The battery powered circular saw of claim 1 further comprising a base plate having a forward end pivotally mounted to the motor housing and handle assembly, a central opening through which the circular saw blade extends and a locking mechanism enabling the orientation of the base plate to be varied so that the amount that the circular saw blade extends through the base plate central opening can be adjusted between a maximum depth of cut orientation when the base plate is generally parallel to the elongate tubular housing and a minimum depth of cut orientation when the base plate is pivoted away from the elongate tubular housing so that the base plate forms an angle α which is within + or −10° relative to the primary handle thereby limiting the maximum amount a user's wrist is bent at the minimum and maximum depth of cut base plate orientations.

6. The battery powered circular saw of claim 1 wherein β is less than 45°.

7. The battery powered circular saw of claim 1 wherein β is less than 40°.

8. The battery powered circular saw of claim 1 wherein a circular saw blade has a diameter of about 5½".

9. The battery powered circular saw of claim 1 wherein the primary handle has an upper surface formed of a soft rubber material for engaging the palm of a user's hand.

10. A battery powered circular saw comprising:
    a DC electric motor;
    a spindle rotatably driven by the electric motor about a transverse axis;
    a thin planar circular saw blade concentrically mounted to the spindle normal to the transverse axis;
    a motor housing and handle assembly including;
       a motor housing portion supporting the electric motor and the rotatably driven spindle;
       an elongate tubular housing portion extending longitudinally rearward from the motor housing portion generally perpendicular to the transverse axis;
       an elongate primary handle having a forward end attached to and spaced above the motor housing portion and a rearward end affixed to the elongate tubular housing portion wherein the primary handle is inclined relative to the elongate tubular housing portion at an angle β which is between 15° and 45°;
       a secondary handle attached to and spaced above the motor housing portion at a location adjacent to the primary handle to enable a user to grasp the saw with two hands; and
    a battery pack removably attached to the rearward end of the primary handle and having an elongated projection extending into the elongate tubular housing portion to electrically connect the battery pack to the electric motor.

11. The battery powered circular saw of claim 10 further comprising a base plate having a forward end pivotally mounted to the motor housing and handle assembly, a central opening through which the circular saw blade extends and a locking mechanism enabling the orientation of the base plate to be varied so that the amount that the circular saw blade extends through the base plate central opening can be adjusted between a maximum depth of cut orientation when the base plate is generally parallel to the elongate tubular housing and a minimum depth of cut orientation when the base plate is pivoted away from the elongate tubular housing so that the base plate forms an angle a which is within + or −10° relative to the primary handle thereby limiting the maximum amount a user's wrist is bent at the minimum and maximum depth of cut base plate orientations.

12. The battery powered circular saw of claim 10 wherein the secondary handle is located forward of the primary handle.

13. The battery powered circular saw of claim 10 wherein the primary handle has an upper surface formed of a soft rubber material for engaging the palm of the user's hand.

14. The battery powered circular saw of claim 10 wherein $\beta$ is less than 40°.

15. The battery powered circular saw of claim 10 wherein the circular saw blade is 5½" in diameter.

* * * * *

UNITED STATES PATENT AND TRADEMARK OFFICE
CERTIFICATE OF CORRECTION

PATENT NO. : 6,470,576 B2
DATED : October 29, 2002
INVENTOR(S) : James Watson

It is certified that error appears in the above-identified patent and that said Letters Patent is hereby corrected as shown below:

Column 3,
Line 58, delete "95" and insert -- 45 --

Column 4,
Line 2, delete "a" and insert "the"

Column 5,
Line 10, delete "a" and insert -- α --

Signed and Sealed this

First Day of April, 2003

JAMES E. ROGAN
*Director of the United States Patent and Trademark Office*